(12) United States Patent
Lidman et al.

(10) Patent No.: US 8,286,653 B2
(45) Date of Patent: Oct. 16, 2012

(54) METHOD AND ARRANGEMENT FOR ELIMINATING THE RISK OF LEAKAGE FROM A FIRST ONE TO A SECOND ONE OF TWO FLUID SYSTEMS

(75) Inventors: Magnus Lidman, Rönninge (SE); Staffan Persson, Tumba (SE)

(73) Assignee: DeLaval Holding AB, Tumba (SE)

( * ) Notice: Subject to any disclaimer, the term of this patent is extended or adjusted under 35 U.S.C. 154(b) by 638 days.

(21) Appl. No.: 12/448,274

(22) PCT Filed: Feb. 5, 2008

(86) PCT No.: PCT/SE2008/000097
§ 371 (c)(1),
(2), (4) Date: Jul. 9, 2009

(87) PCT Pub. No.: WO2008/097160
PCT Pub. Date: Aug. 14, 2008

(65) Prior Publication Data
US 2010/0193037 A1    Aug. 5, 2010

(30) Foreign Application Priority Data
Feb. 5, 2007    (SE) ...................................... 0700274

(51) Int. Cl.
*F16K 1/44*    (2006.01)
(52) U.S. Cl. ...................... 137/14; 137/312; 137/614.21; 137/861
(58) Field of Classification Search .................. 137/312, 137/240, 15.11, 14, 614.13, 597, 861, 614.21
See application file for complete search history.

(56) References Cited

U.S. PATENT DOCUMENTS

| 3,344,807 | A |   | 10/1967 | Leherer et al. |
| 3,720,222 | A | * | 3/1973  | Andrews et al. ............... 137/154 |
| 3,835,878 | A |   | 9/1974  | Braidt et al. |
| 5,906,374 | A |   | 5/1999  | Arbuckle |

OTHER PUBLICATIONS

International Preliminary Report on Patentability issued on Aug. 20, 2009 in corresponding International Application No. PCT/SE2008/000097.
Written Opinion of the International Searching Authority dated May 6, 2008 in corresponding International Application No. PCT/SE2008/000097.

* cited by examiner

*Primary Examiner* — Kevin Lee
(74) *Attorney, Agent, or Firm* — Young & Thompson

(57) ABSTRACT

A method is provided for eliminating the risk of leakage from a first one to a second one of two fluid systems in an apparatus for handling a fluid for human consumption, with a shut-off device including a cavity and a respective valve element connecting the cavity to each of the two fluid systems, each valve means being capable of preventing any fluid communication from the cavity to the respective fluid system. When the valve element prevents any fluid communication from the cavity to the fluid systems, a fluid is supplied to the cavity and a pressure is provided in the cavity which is higher than one or each of the respective pressures in the two fluid systems, thereby eliminating the risk of leakage from a first one to a second one of two fluid systems in case of failure of the valve element.

35 Claims, 6 Drawing Sheets

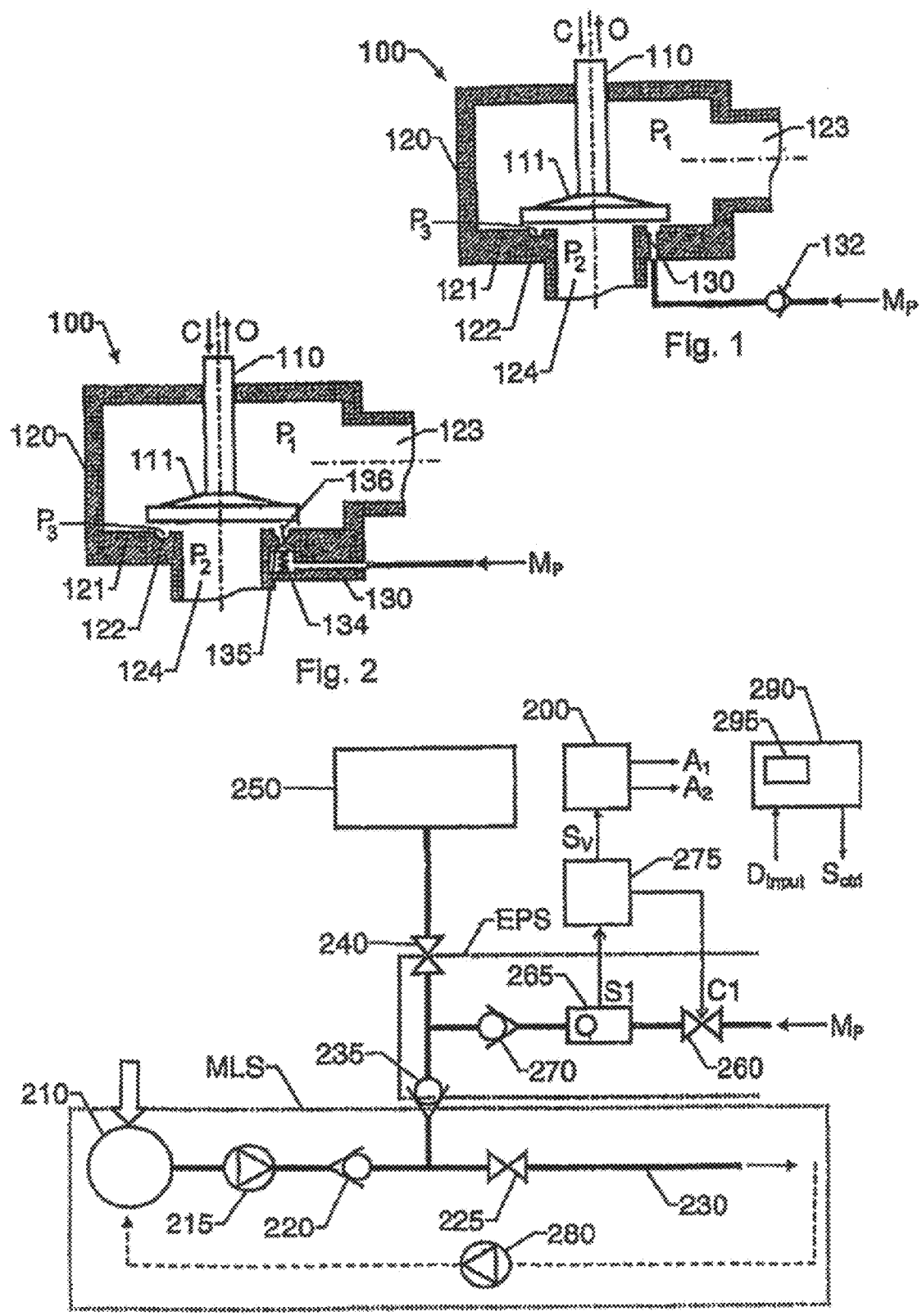

METHOD AND ARRANGEMENT FOR ELIMINATING THE RISK OF LEAKAGE FROM A FIRST ONE TO A SECOND ONE OF TWO FLUID SYSTEMS

TECHNICAL FIELD OF THE INVENTION

The present invention generally relates to the separation of fluids in an apparatus provided for handling a fluid for human consumption. Particularly, the invention relates to a method and an arrangement for eliminating the risk of leakage from a first one to a second one of two fluid systems in such an apparatus.

DESCRIPTION OF RELATED ART AND BACKGROUND OF THE INVENTION

U.S. Pat. No. 6,852,172 discloses a milking plant for milking animals, such as cows, wherein milk collecting means, preferably in the form of teat cups, are attached to the teat of the animal after which milk is taken from the animal by use of vacuum. The milk is transported by a milk line system to milk storage means comprising a cooling tank. For cleaning purposes the milk line system from each milk collecting means can be shut off from the milk tank by valve means in order for separate cleaning of the milk line system. The invention is characterized by preventing any possible leakage of detergent from a cleaning fluid to the milk that has been collected in the milk tank, by providing a pressure difference between the two fluids. The pressure difference between the fluids is preferably achieved by connecting the cleaning fluid to the vacuum supply of the milking plant.

A problem of such approach is that one of the fluid systems has always to have a lower internal pressure than the other fluid system, that is, in the above application the cleaning fluid system is connected to vacuum whereas the milk tank system is kept at a higher pressure. Thus, one is restricted to use vacuum based cleaning techniques. Further, if the vacuum fails, the pressure will increase in the cleaning fluid system possibly to a hazardous level where there is risk of leaking cleaning fluid into the milk tank system.

Devices based on a so-called block-bleed-block valve assembly have been provided to remedy the above mentioned problem and to fulfill regulations concerning the handling of fluids for human consumption. A block-bleed-block valve assembly comprises two valve means serially connected between two fluid systems that should not be mixed. The cavity formed between the valve means and the two fluid systems are held at pressures so that the pressure in the cavity is always lower than the pressure in each of the fluid systems. Preferably, the cavity is held at underpressure. The cavity is typically connected to a drain for draining fluid leaking from the fluid systems into the cavity.

A problem of such block-bleed-block valve assembly approach is that the cavity and drain are difficult to clean. Further, if the drain is open to the atmosphere a contamination risk is achieved. Bacteria may enter the drainage and contaminate the cavity and the fluid systems. Another problem is that the operation of the block-bleed-block valve assembly may be difficult to monitor, in particular when the cavity already contains fluid from a least one of the two fluid systems.

SUMMARY OF THE INVENTION

Accordingly, it is an object of the present invention to provide a method and shut-off device for eliminating the risk of leakage from a first one to a second one of two fluid systems in an apparatus provided for handling a fluid for human consumption, which avoid or at least alleviate at least some of the problems associated with the prior art approaches.

It is in this respect a particular object of the invention to provide such a method and device, which are effective, fast, accurate, reliable, safe, inexpensive, and easy to install, operate and maintain.

These objects among others are, according to the present invention, attained methods and shut-off devices as claimed in the appended patent claims.

According to a first aspect of the invention there is provided a method for eliminating the risk of leakage from a first one to a second one of two fluid systems in an apparatus provided for handling a fluid for human consumption, wherein the apparatus comprises a shut-off device including a cavity and a respective valve means connecting the cavity to each of the two fluid systems. Each of the valve means is capable of preventing any fluid communication from the cavity to the respective fluid system. According to the method, when the valve means prevent any fluid communication from the cavity to the fluid systems, a fluid is supplied to the cavity and a pressure is provided in the cavity which is higher than one or each, preferably each, of the respective pressures in the two fluid systems, thereby eliminating the risk of leakage from a first one to a second one of two fluid systems in case of failure of the valve means.

One or, more preferably, each of the valve means my be switchable into an open state, wherein the cavity and the respective fluid system are generally in fluid communication with one another, and a closed state, wherein the cavity and the respective fluid system are generally not in fluid communication with one another.

One or each of the valve means may, however, be a non-return valve.

In one embodiment of the invention the valve means are each a separate valve and the cavity, to which the fluid is supplied, is a chamber arranged between the valves.

In another embodiment of the invention the shut-off device includes a double-seated valve, the valve means comprise each a respective valve seat portion and valve disc portion of the double-seated valve, and the cavity, to which the fluid is supplied, is a recess arranged between the valve seat portions of the double-seated valve.

According to a second aspect of the invention there is provided a shut-off device for implementing the above method. The shut-off device comprises a cavity; a respective valve means connecting the cavity to each of the two fluid systems, wherein each of the valve means is capable of preventing any fluid communication from the cavity to the respective fluid system; and an arrangement provided, when the valve means prevent any fluid communication from the cavity to the fluid systems, for supplying a fluid to said cavity and for creating a pressure in said cavity which is higher than one or, preferably, each of the respective pressures in the two fluid systems.

An advantage of the present invention is that the cavity will not be contaminated.

Further, a drain outlet is not required and no contamination risks will thus occur.

Yet further, the operation of the invention is easy and straightforward to monitor in a multiplicity of manners.

Further characteristics of the invention and advantages thereof will be evident from the following detailed description of embodiments of the invention.

BRIEF DESCRIPTION OF THE DRAWINGS

FIGS. 1-5 illustrate each schematically a shut-off device for eliminating the risk of leakage between two fluid systems FIG. 6 illustrates schematically a milking plant wherein the shut-off device of FIG. 4 is installed to prevent leakage between two fluid systems of the milking plant.

Identical parts, details and components have been given the identical reference numerals throughout the Figures.

DETAILED DESCRIPTION OF EMBODIMENTS

Figure 3A:
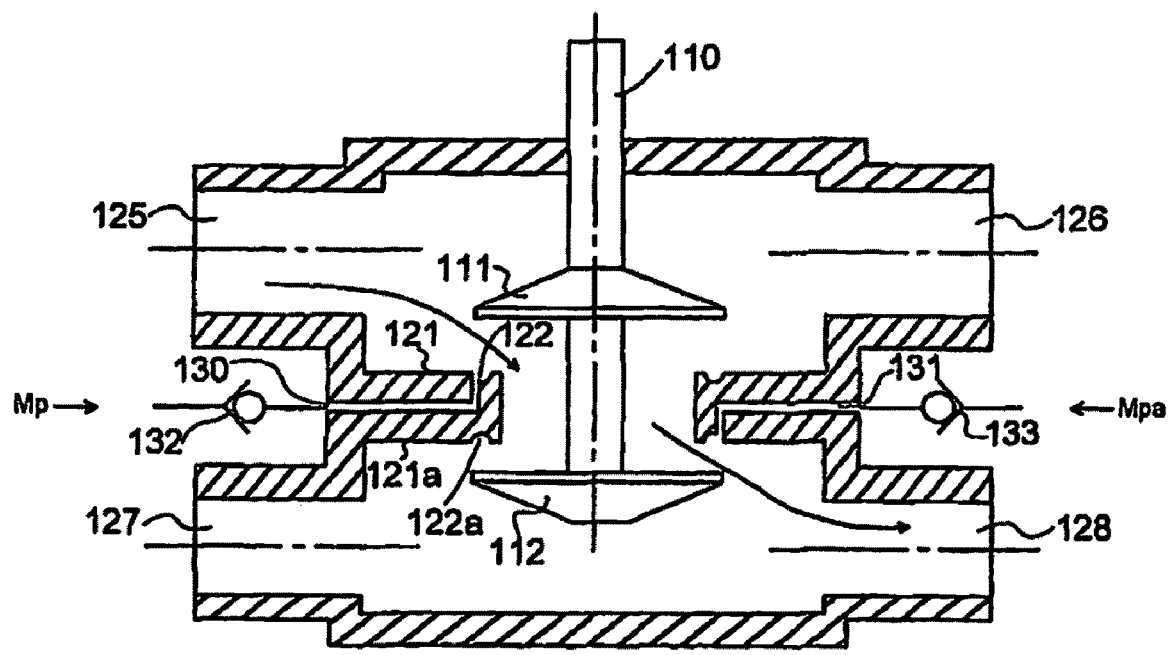

We refer initially to FIG. 1, which illustrates schematically a shut-off device for eliminating the risk of leakage between two fluid systems in an apparatus provided for handling a fluid for human consumption according to an embodiment of the invention. The shut-off device includes a double-seated valve 100 having a housing cover 120, wherein a valve disc 111 is adapted to be adjustable relative to a valve seat 121, for example along a symmetry axis of a valve spindle 110 connected to the valve disc 111, so as to either connect a first fluid system or volume 123 to a second fluid system or volume 124, or separate these two fluid systems 123 and 124 from one another. Thus, moving the valve disc 111 in a first direction O along the symmetry axis of the valve spindle 110 opens up a passage between the first fluid system 123 and the second fluid system 124. Conversely, moving in the valve disc 111 in a second direction C, opposite to the first direction O, decreases this passage. When the valve means 100 is fully closed, i.e. when the valve disc 111 has been adjusted to an extreme position in the second direction C, it is desired that no fluid may pass from the first fluid system 123 to the second fluid system 124, or vice versa. In this positioning of the valve disc 111 any fluid passage is defined as a leak.

Naturally, in practice, the double-seated valve 100 cannot in the long run accomplish a completely leakage-free sealing of the first fluid system 123 from the second fluid system 124. Therefore, the double-seated valve is provided with a fluid channel 130 adapted to receive a pressurized medium $M_p$ and forward the medium $M_p$ to a contact zone in which the valve disc 111 contacts the valve seat 121 in the closed position. Specifically, the valve seat 121 comprises a cavity or chamber, e.g. in the form of a recess 122, which is connected to the fluid channel 130. The recess is arranged so that the seat 121 defines a respective seat portion on either side of the recess 122.

Hence, a predefined amount of pressurized medium $M_p$ can be trapped and stored in the contact zone, i.e. between the first and second fluid systems 123 and 124 respectively, when the double-seated valve 100 is closed. This is advantageous because the pressurized medium $M_p$ creates a pressure barrier between the first and second fluid systems 123 and 124 provided that the pressurized medium $M_p$ is supplied at an adequate pressure level $P_3$ which exceeds the pressure levels $P_1$, $P_2$ of each of the first and second fluid systems 123 and 124. In some applications the pressure level of the pressurized medium $M_p$ is only required to be higher than one of the pressure levels $P_1$, $P_2$ of the first and second fluid systems 123 and 124.

Naturally, the container for the pressurized medium $M_p$ may instead be formed partially, or entirely, by a recess in the valve disc 111. Although being somewhat more complex from a design point-of-view, it is further conceivable that the fluid channel 130 be arranged through the valve spindle 110 and the valve disc 111 instead of through the valve seat 121.

Naturally, the pressurized medium $M_p$ is exclusively applied after that the valve means 100 has been adjusted to its closed position. Further, the fluid channel 130 is preferably provided with a non return valve 132 adapted to accomplish a one-way supply of the pressurized medium $M_p$ to the double-seated valve 100. It is further advantageous if the fluid channel 130 has a shut-off valve, which is controllable in response to the positioning of the valve disc 111, such that the pressurized medium $M_p$ is only supplied when the double-seated valve 100 is closed.

FIG. 2 illustrates schematically a shut-off device according to a modified embodiment of the invention, wherein a valve cone 135 is included, which is adapted to automatically achieve the supply of the pressurized medium $M_p$ only when the double-seated valve 100 is closed. Whenever the double-seated valve 100 is open (i.e. the valve disc 111 is separated from the valve seat 121 more than a predetermined distance), the valve cone 135 is pushed to a closed position by means of a resilient member 134, e.g. in the form of a spring. The valve cone 135 is also associated with a protruding member 136 pointing towards the valve disc 111. The protruding member 136 is arranged such that when the valve disc 111 is adjusted closer to the valve seat 121 than the predetermined distance, the valve cone 135 opens up and forwards the pressurized medium $M_p$ towards the valve disc 111. Here, a smaller amount of the medium $M_p$ may leak into the first or second fluid systems 123, 124. However, as soon as the valve disc 111 contacts the valve seat 121, the pressurized medium $M_p$ is trapped in the recess 122 to constitute the above-mentioned pressure barrier, and any further consumption of the pressurized medium is due to leakage. The brief input of pressurized medium $M_p$ may be detected and used by a central processing unit as an indication that the double-seated valve 100 has been closed.

Double-seated valves can be advantageous when for instance two fluid systems have to be connectable to one another and have to be disconnectable in order to be cleaned independently of one another at e.g. different times. FIG. 3a illustrates schematically a shut-off device according to a further embodiment of the invention, which is capable of handling the above situation. The shut-off device have four inlets/outlets 125, 126, 127, 128 and comprises a valve device featuring two double-seated valves connected together, that is, two oppositely located valve discs 111, 112 are connected to a single valve spindle 110. In the open position (FIG. 3a) all four inlets/outlets 125, 126, 127, 128 are connected to one another, in one closed position (FIG. 3b) the lower one 112 of the valve discs closes against a lower valve seat 121a disconnecting the inlets/outlets 125 and 126 from the inlets/outlets 127 and 128 and exposing an upper valve seat 121, and in another closed position (FIG. 3c) the upper one 111 of the valve discs closes against the upper valve seat 121 disconnecting the inlets/outlets 125 and 126 from the inlets/outlets 127 and 128 and exposing the lower valve seat 121a. Each of the valve seats 121, 121a includes a respective recess 122, 122a connectable to a source of pressurized medium $M_p$, $M_{pa}$ via a respective valve 132, 133 and a respective fluid channel 130, 131.

In one exemplary application the inlet/outlet 125 is in a first operation mode connected to transport a fluid via the valve inlet/outlet 128 to e.g. a storing tank (not illustrated). The valve device is in the open position as illustrated in FIG. 3a and the inlets/outlets 126 and 127 are connected to valves (not illustrated), which are closed during the transportation.

Figure 3B:
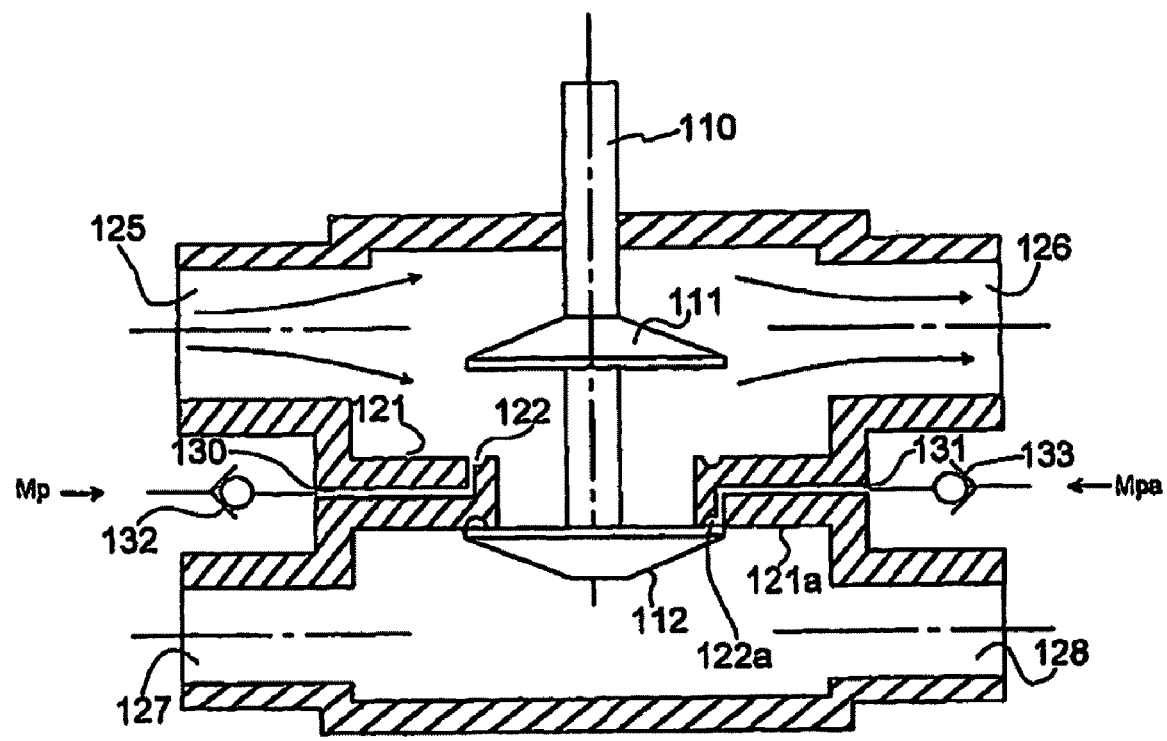

In a second operation mode the valve device is switched into the first closed position as illustrated in FIG. 3b. Now, the upper part of the shut-off device including the inlets/outlets 125 and 126, the valve disc 111 and the valve seating 121 with the recess 122 can be cleaned by flowing a solution containing detergent and flushing water through the upper part of the shut-off device. The detergent solution is flowed from the input/output 125, through the upper part of the shut-off device, and out through the inlet/outlet 126 or in the opposite direction. Optionally the fluid channel 130 and the valve 132 are cleaned by flowing detergent solution there through. Hereby, high hygienic demands are fulfilled.

Figure 3C:
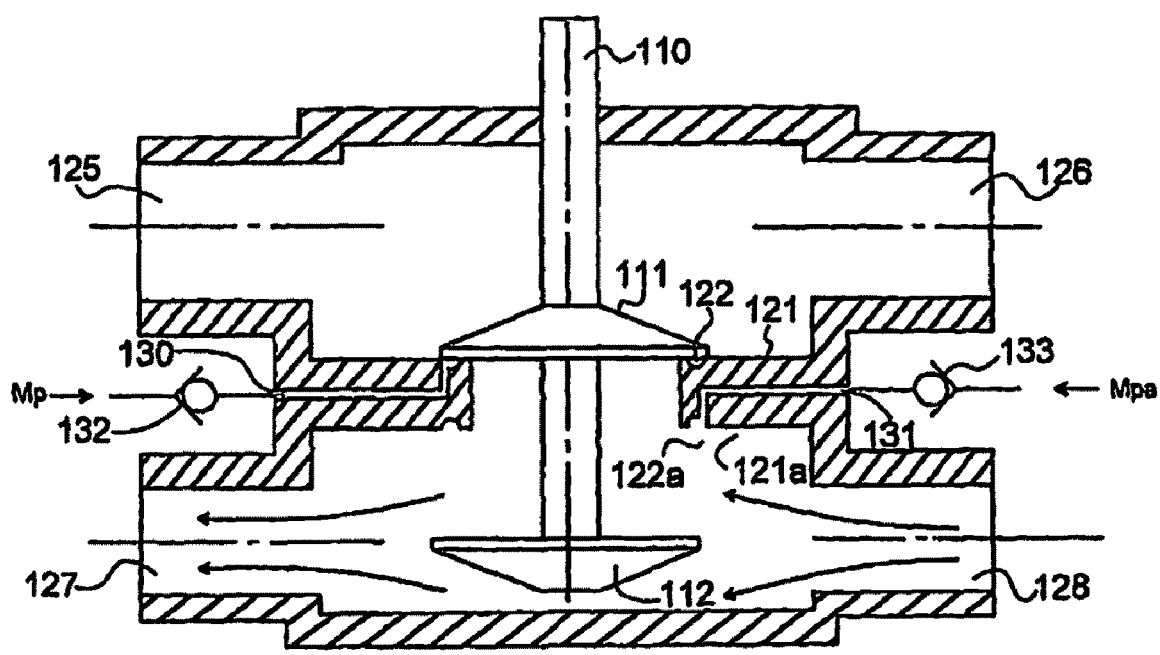

In a third operation mode the valve device is switched into the second closed position as illustrated in FIG. 3c. Now, the storing tank can be emptied e.g. through the inlets/outlets 128 and 127 and thereafter the lower part of the shut-off device including the inlets/outlets 127 and 128, the valve disc 112, the valve seating 121a with the recess 122a, and optionally the fluid cannel 131 and the valve 133 can be cleaned without affecting the upper part of the shut-off device.

It is worth pointing out that the double-seated valves shown in FIGS. 1-3 are intended to illustrate proposed general principles to accomplish sanitary acceptable boundaries between two fluid systems in an apparatus provided for handling a fluid for human consumption.

Figure 4:
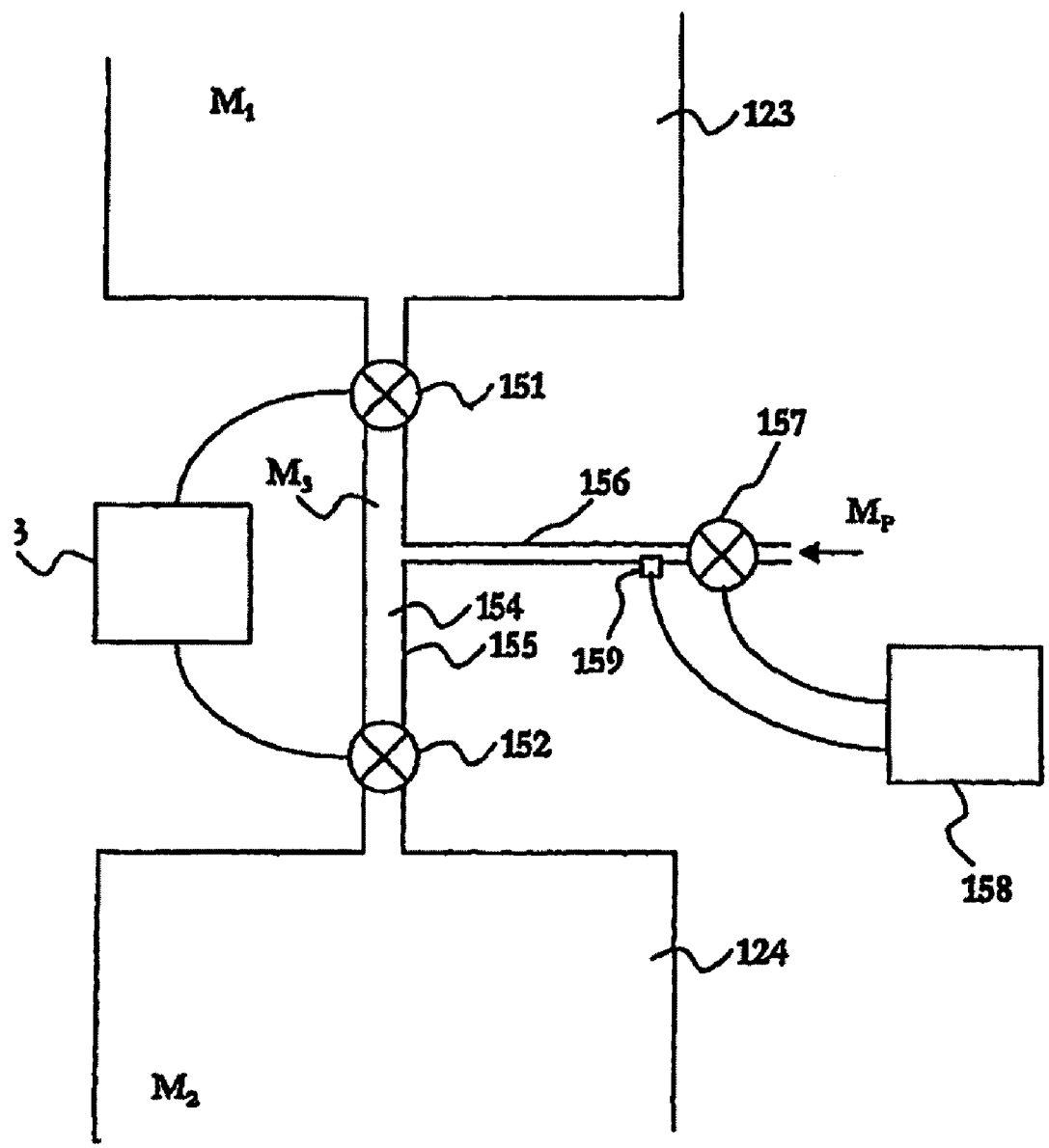

As an alternative to the double-seated valve of FIGS. 1-3 a pair of valves separated by a piece of pipe can be used, wherein the valves are operated synchronously and the piece of pipe is pressurized. Such alternative is illustrated in FIG. 4.

The two valves 151, 152 are operated together fully automatically under the control of a control device 153. The cavity or chamber to be pressurized is the interior 154 of a pipe 155 separating the two valves. This arrangement thus separates the two fluid systems 123, 124. The pressurized medium $M_p$ is supplied to the interior 154 of the piece of pipe 155 via a pipe 156 and a valve 157, which is controlled by a control device 158.

The control devices 153 and 158 may be exchanged for a single device, which may be responsible for the control and operation of the shut-off device and optionally of the two fluid systems. Such arrangement may be fully automatic.

When the valves 151, 152 have been switched to the closed states, the pressurized medium $M_p$ is supplied to the interior 154 of the pipe 155 to maintain a pressure level $P_3$ therein which is higher than one or each of the respective pressure levels $P_1$, $P_2$ in the two fluid systems 123, 124 to thereby eliminate the risk of leakage between the two fluid systems 123, 124 in case of failure of the valves 151, 152.

It shall be appreciated that one or each of the valves 151 and 152' is exchanged for a non-return valve arranged so that fluid can pass from the fluid system connected thereto but not to the fluid system. If both valves 151 and 152 are non-return valves fluid from the fluid systems may be output through the pipe 156 or any other pipe connected to the pipe 155 during some mode of operation, otherwise there would be no reason for having the two fluid systems interconnected by non-return valves in the manner described.

A pressure sensor 159 may be provided for sensing the pressure in the pipes 155, 156 and for forwarding the sensed pressure to the control device 158, which may control the valve 157 in response thereto in order to maintain a desired pressure level in the pipes 155, 156 to secure a proper operation of the shut-off device.

In one simple algorithm the valve 157 closes at a first pressure, thus shutting off the supply of the fluid to the pipe 155, and opens at a second pressure, which is lower than the first pressure, thus reopening the supply of the fluid to the pipe 155.

Alternatively, the valve 157 may be exchanged for other means to provide a desired pressure in the pipe 155 such as a variable frequency pump.

It shall be appreciated that the above described embodiments can be combined to form yet further embodiments of the invention. In particular, each of the systems for supplying the pressurized medium M, can be combined with each of the valve and cavity arrangements forming the block-cavity-block arrangement for separation of the two fluid systems 123, 124.

As an alternative to the supply of a fluid to the recess 122 (FIGS. 1-3) or the pipe 155 (FIG. 4) the pressure therein may be created by means of inserting an element into the recess 122 or the pipe 155 to thereby increase the pressure of an existing fluid therein by reducing the volume. Yet alternatively, the volume can be reduced by providing the recess 122 or the pipe 155 with an elastic wall, which is pressed in.

Still further, each of the embodiments disclosed above can be modified to incorporate the following monitoring, alarming, and operation approaches.

Leakage of the fluid supplied to the recess 122 or the pipe 155 (in the following referred to by the generalized expression cavity) into any of the two fluid systems 123, 124 can be monitored. For moderate leakage levels this leakage is normally unproblematic. However, the pressurized medium $M_p$ ought to have a composition which is adapted to have minimal influence on the fluids present in either one or both of the first and second fluid systems 123 and 124.

The leakage can be monitored by means of measuring the time lapsed between subsequent shut-offs and/or openings of the valve 157 if present.

Alternatively, leakage of the fluid supplied to the cavity into any of the two fluid systems 123, 124 can be monitored e.g. by measuring by a flow meter or other means the consumption of the fluid supplied to the cavity during a period when the valve arrangement is closed.

Yet, alternatively, the leakage of the fluid supplied to the cavity into any of the fluid systems is monitored by means of measuring the presence of the fluid in any of the fluid systems.

Yet further, alternatively an additive is added to the fluid supplied to the cavity and leakage of the fluid supplied to the cavity into any of the fluid systems is monitored by means of measuring the additive.

Figure 5:
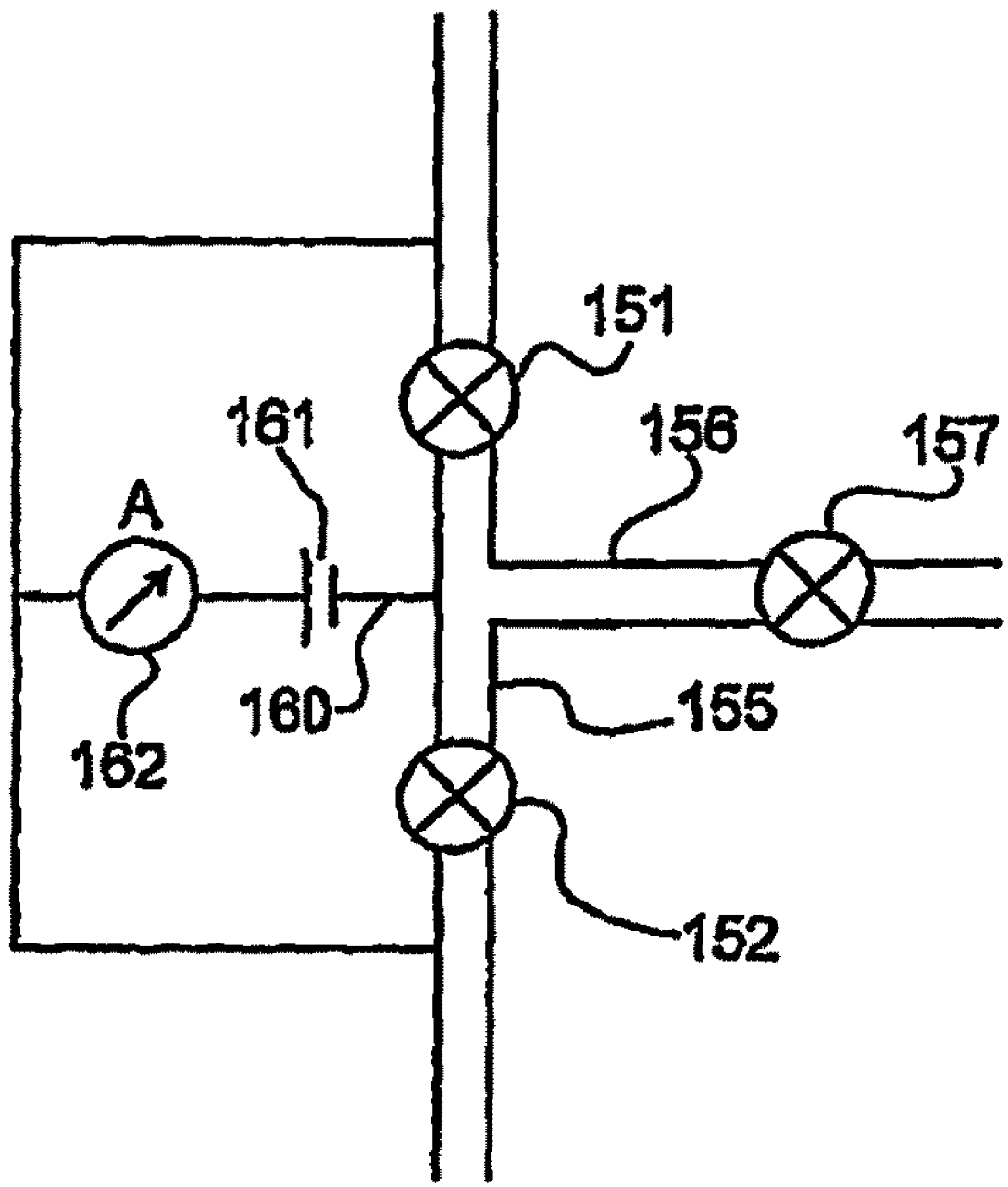

Still alternatively if the fluid supplied to the cavity is one of the fluids in the first and second fluid systems 123 and 124 (which is electrically conductive to a certain extent) and the pressure in the cavity is provided without the introduction of further fluid to the cavity when the valves have been closed, the leakage flow can be measured by providing the cavity and the valves electrically insulated. Such an example is shown in FIG. 5. The cavity 155 is connected to a current source 161 and the current which occurs when the fluid leaks through one of the valves 151 and 152 is measured by a current sensing device 162.

The valves 151, 152, and 157 provide for electrical insulation of the pipes 155 and 157. An electrical connection 160 is connected between the electrically insulated pipe system and the pipes of the two fluid systems via the current source 161 and the current sensing device 162.

The current sensing device 162 registers a weak current when the valves 151 and 152 are closed and fluid tight depending on the fluid film that is present between the sealing surfaces of the valves 151 and 152. The current increases considerably at leakage of the fluid through either one of the valves 151 and 152.

The fluid in the cavity which has to be electrically conductive may be a watery fluid having a salt content which is not negligible.

The monitored leakage of the fluid supplied to the cavity may be compared with a threshold value and based on the comparison one or several pieces of information can be deduced and/or actions can be performed:

Information of the function of the shut-off device can be deduced

A security condition of the shut-off device can be deduced

An alarm can be alerted

The apparatus provided for handling a fluid for human consumption can be shut-down The pressurized medium can be chosen based on different criteria depending on the application in which the invention is used.

The pressurized medium may be self-separating from the fluids in the two fluid systems. This is the case for instance when the two fluid systems contain liquids and the pressurized medium is a gas. Different phases thus provide for self-separation. Other approaches may be based on insolubility or precipitation.

Generally, the pressurized medium may be a liquid, a gas or a vapor, preferably air, nitrogen, oxygen, carbon dioxide, a noble gas, an inert gas, or a mixture thereof, which is harmless for human consumption and/or which does not negatively affect the operation of the apparatus provided for handling a fluid for human consumption. Similarly, the fluids in the fluid systems are each a liquid, a gas or a vapor.

The pressurized fluid may in some applications be identical to, or comprise, one of the fluids in the fluid systems.

In one exemplary embodiment the apparatus provided for handling a fluid for human consumption is a plant provided for handling liquid food, preferably milk, wherein one of the fluids in the fluid systems is the liquid food, preferably milk, and the other one of the fluids in the fluid systems is a cleaning liquid.

An example of such plant is schematically illustrated in FIG. 6, in which a shut-off device similar to that of FIG. 4 is installed to prevent leakage between a milk system and cleaning fluid system of the plant in accordance with the invention.

The plant, which is a milking plant, includes a primary milk collector 210, e.g. in the form of a so-called end unit, adapted to receive milk from milk collecting means attached to the teats of one or more animals. It is presumed that the milking plant includes a vacuum supply system, which is connected to the milk collecting means, and is adapted to withdraw milk from the teats. However, for reasons of a clear presentation, neither the vacuum supply system nor the milk collecting means is shown in FIG. 6. The milking plant further includes a milk line system MLS, milk storage valve means 235 and 240, a milk storage means 250 and a monitoring arrangement, which in turn includes a pressure regulating system EPS.

The milk line system MLS is connected to the collecting means via the primary milk collector 210, and is adapted to deliver the withdrawn milk to the milk storage means 250. The primary milk collector 210 is either permanently connected to the milk line system MLS, or the primary milk collector 210 is connectable to the milk line system MLS on demand (i.e. whenever milk is to be delivered to the milk storage means 250). The milk storage valve means 235 and 240 are arranged between the milk line system MLS and the milk storage means 250. At least one valve means of the milk storage valve means 235 and 240 is adapted to be selectively adjustable to prevent fluid communication between the milk line system MLS and the milk storage means 250 during cleaning of the milk line system MLS.

In the embodiment of the invention shown in FIG. 6, the milk line system MLS includes the primary milk collector 210, a milk pump means 215, a first non-return valve 220, a first adjustable valve 225 and a dump line 230. The milk pump means 215 is connected to the primary milk collector 210, and adapted to draw milk received therein through the first non-return valve 220.

This valve, in turn, is connected to an upstream side of the first adjustable valve 225 and a second non-return valve 235 included in the milk storage valve means. The downstream side of the first adjustable valve 225 is connected to the dump line 230 through which any discarded milk may be discharged.

During normal operation of the milking plant, the first adjustable valve 225 is closed, such that the milk passes from the primary milk collector 210, via the milk pump means 215, the first non-return valve 220 and through the second non-return valve 235. This valve, in turn, is further connected to an up-stream side of a second adjustable valve 240 (included in the milk storage valve means) and a third non-return valve 270. The downstream side of the second adjustable valve 240 is further connected to the milk storage means 250. The third non-return valve 270 is adapted to prevent milk received via the second non-return valve 235 to enter a conduit system for receiving the pressurized medium $M_p$. When operating the milking plant in this milk-receiving mode, the second adjustable valve 240 is open. Thus, the milk from the second non-return valve 235 continues into the milk storage means 250.

If it is decided that the milk in the primary milk collector 210 is to be discarded, the second adjustable valve 240 is closed and the first adjustable valve 225 is opened. Consequently, the milk passes out via the dump line 230 instead of into the milk storage means 250.

Also when cleaning the milking plant, the second adjustable valve 240 is closed and the first adjustable valve 225 is opened. However, in this case, instead of receiving milk the primary milk collector 210 receives cleaning fluid. The cleaning fluid is passed via the milk pump means 215, the first non-return valve 220, the first adjustable valve 225 and the dump line 230.

Preferably, the dump line 230 is connected to a cleaning fluid conduit and a return pump means 280, which is adapted to circulate the cleaning fluid back to the milk collecting means and further to the primary milk collector 210.

A milk side of the valve means 240 and 235 is defined, which is connected to the milk storage means 250. Throughout the cleaning process it is important that no cleaning fluid passes over to the milk side. Moreover, a quality measure of the valve means 240 and 235 sealing function is desired. Therefore, accordingly the milk storage valve means 235 and 240 are associated with an arrangement that is represented by reference signs 275 and EPS in FIG. 6. The arrangement is adapted to determine the amount of leakage through the milk storage valve means 235 and 240 during the cleaning of the milk dine system MLS. The monitoring arrangement is also adapted to produce a valve health status signal $S_v$ that reflects the amount of leakage through the milk storage valve means 235 and 240.

According to one embodiment of the invention, the milking plant further includes a data processing unit 200, which is adapted to receive the valve health status signal $S_v$. The data processing unit 200 is adapted to determine whether or not the health status signal $S_v$ fulfills at least one test condition, and if so, the unit produces at least one resulting signal, represented by $A_1$ and $A_2$ in FIG. 6.

Preferably, any resulting signal $A_1$ and/or $A_2$ is forwarded to a central processing unit 290, for instance as a part of a generic Dinput. The central processing unit 290 is adapted to control the overall operation of the milking plant involving closing and opening the various valves 225 and 240, operating the milk pump means 215 and the return pump means 280, as well as verifying relevant statuses of these components depending on in which mode the milking plant currently is operated. For clarity reasons, no control signal lines or return data lines are shown in FIG. 6. Instead, generic outputs Dinput and inputs Sctrl respectively from and to the central processing unit 290 are illustrated. The central processing unit 290 includes a computer readable medium 295 (e.g. represented by a memory module), which has a program recorded thereon, where the program is adapted to make the central processing unit 290 control the milking plant according to the proposed procedure.

The monitoring arrangement includes a pressure regulating system EPS, which is adapted to accomplish a first fluid pressure on a milk side of the valve means 235 and 240, where the first fluid pressure exceeds a second fluid pressure in the milk line system MLS when the milk storage valve means 235 and 240 are closed (i.e. do not forward any milk to the milk storage means 250).

To this end the pressure regulating system EPS is adapted to receive a pressurized medium $M_p$, for example in the form of a gas (e.g. air) or a liquid (e.g. milk) of predefined quality, and forward the pressurized medium $M_p$ to the milk side. Thereby, the first fluid pressure is developed, such that this pressure exceeds the second fluid pressure in the milk line system MLS. After that the first pressure $P_M$ has been developed, the pressure regulating system EPS is adapted to register any consumption of the pressurized medium $M_p$, and in response thereto produce the valve health status signal $S_v$.

For this purpose, the pressure regulating system EPS preferably includes the third non-return valve 270, a sensor means 265 and a third adjustable valve means 260. The third adjustable valve means 260 is operable in response to a control signal C1 from a control module 275. For example, the control signal C1, in turn, may be based on an initial instruction from the central processing unit 290, so that in connection with instigating the cleaning process, the third adjustable valve means 260 opens up and starts receiving the pressurized medium $M_p$ into the fluid conduits of the pressure regulating system EPS. It is generally desirable that these conduits have a relatively small and well-defined volume because thereby a stable first pressure can be developed comparatively quickly.

The sensor means 265 is connected between the third adjustable valve means 260 and the third non-return valve 270. As mentioned above, the third non-return valve 270 is adapted to prevent milk from entering the fluid conduits of the pressure regulating system EPS during milking. However, the valve 270 is adapted to allow the pressurized medium $M_p$ to reach the milk storage valve means 235 and 240, and thus develop the first pressure when cleaning fluid is present in the milk line system MLS. If at least one of the valve means 235 and 240 leaks; this will result in that an amount of the pressurized medium MP leaves the pressure regulating system EPS. The sensor means 265 is adapted to register any consumption of the pressurized medium $M_p$, and report this to the control module 275 by means of a signal S1. Hence, the sensor means 265 may include a flow meter. Furthermore, the control module 275 may be adapted to maintain the first pressure: (i) at an essentially constant level, (ii) at a level exceeding the second pressure by a predefined amount, or (iii) at a level having a predefined relationship to the second pressure.

Thus in the milking plant described above the shut-off device for eliminating the risk of leakage between two fluid systems in accordance with the invention includes the milk storage valve means 235 and 240, the pressure regulating system EPS, and control module 275.

In another exemplary embodiment (not illustrated) the apparatus provided for handling a fluid for human consumption comprises fluid systems, which handle or are cleaned or otherwise treated with different fluids, such as one acid fluid and one alkali fluid.

The invention claimed is:

1. A method of minimizing leakage from a first one to a second one of two fluid systems in an apparatus provided for handling a fluid for human consumption, wherein each of the fluid systems includes a fluid at a respective pressure and the apparatus comprises a shut-off device including a cavity and a respective valve means connecting the cavity to each of the two fluid systems, each of the valve means preventing fluid communication from the cavity to the respective fluid system, wherein the method comprises the steps of:
to prevent fluid communication from the cavity to the fluid systems, supplying a fluid to said cavity and providing a pressure in said cavity which is higher than one or each of the respective pressures in the two fluid systems, thereby minimizing the risk of leakage from a first one to a second one of two fluid systems in case of failure of the valve means,
wherein each of the valve means is switchable into i) an open state wherein the cavity and the respective fluid system are in fluid communication with one another, and ii) a closed state wherein the cavity and the respective fluid system are not in fluid communication with one another, and
wherein the valve means are each a valve and the cavity, to which the fluid is supplied, is a chamber arranged between the valves.

2. The method of claim 1 wherein the pressure in said cavity is provided to be higher than each of the respective pressures in the two fluid systems, thereby minimizing the risk of leakage between the two fluid systems in case of failure of the valve means.

3. The method of claim 1 wherein said switchable valve means is automatically switched under the control of a control device.

4. The method of claim 1 wherein at least one of the valve means comprises a non-return valve.

5. The method of claim 1 wherein the fluid supplied to the cavity is supplied to the cavity via a valve device and the pressure in said cavity is monitored.

6. The method of claim 5 wherein the valve device closes at a first pressure, thus shutting off the supply of the fluid to the cavity, and opens at a second pressure, which is lower than said first pressure, thus reopening the supply of the fluid to the cavity.

7. The method of claim 6 wherein leakage of the fluid supplied to the cavity into any of the fluid systems is monitored by means of measuring the time lapsed between subsequent shut-offs and/or openings of the valve device.

8. The method of claim 1 wherein leakage of the fluid supplied to the cavity into any of the fluid systems is monitored.

9. The method of claim 8 wherein the leakage of the fluid supplied to the cavity into any of the fluid systems is monitored by means of measuring the consumption of the fluid supplied to the cavity.

10. The method of claim 8 wherein the consumption of the fluid supplied to the cavity is measured by a flow meter.

11. The method of claim 8 wherein the leakage of the fluid supplied to the cavity into any of the fluid systems is monitored by means of measuring the presence of the fluid in any of the fluid systems.

12. The method of claim 8 wherein an additive is added to the fluid supplied to the cavity and leakage of the fluid supplied to the cavity into any of the fluid systems is monitored by means of measuring said additive.

13. The method of claim 7 wherein the monitored leakage of the fluid supplied to the cavity is compared with a threshold value and information of the function of the shut-off device is deduced based on said comparison.

14. The method of claim 7 wherein the monitored leakage of the fluid supplied to the cavity is compared with a threshold value and a security condition of the shut-off device is deduced based on said comparison.

15. The method of claim 7 wherein the monitored leakage of the fluid supplied to the cavity is compared with a threshold value and an alarm is alerted based on said comparison.

16. The method of claim 7 wherein the monitored leakage of the fluid supplied to the cavity is compared with a threshold value and the apparatus provided for handling a fluid for human consumption is shut-down based on said comparison.

17. The method of claim 1 wherein the pressure in said cavity is provided by means of inserting an element into said cavity or by providing the cavity with an elastic wall, which is pressed in.

18. The method of claim 1 wherein the fluid supplied to the cavity is self-separating from the fluids in the two fluid systems.

19. The method of claim 1 wherein the fluid supplied to the cavity is a liquid, a gas, or a vapor.

20. The method of claim 1 wherein the fluid supplied to the cavity is identical to, or comprises, one of the fluids in the fluid systems.

21. The method of claim 1 wherein the fluids in the fluid systems are each a liquid, a gas or a vapor.

22. The method of claim 1 wherein one of the fluids in the fluid systems is liquid food.

23. The method of claim 1 wherein one of the fluids in the fluid systems is a cleaning liquid.

24. A method of minimizing leakage from a first one to a second one of two fluid systems in an apparatus provided for handling a fluid for human consumption, wherein each of the fluid systems includes a fluid at a respective pressure and the apparatus comprises a shut-off device including a cavity and a respective valve means connecting the cavity to each of the two fluid systems, each of the valve means preventing fluid communication from the cavity to the respective fluid system, wherein the method comprises the steps of:
to prevent fluid communication from the cavity to the fluid systems, supplying a fluid to said cavity to provide a pressure in said cavity which is higher than one or each of the respective pressures in the two fluid systems, thereby minimizing the risk of leakage from a first one to a second one of two fluid systems in case of failure of the valve means,
wherein each of the valve means is switchable into i) an open state wherein the cavity and the respective fluid system are in fluid communication with one another, and ii) a closed state wherein the cavity and the respective fluid system are not in fluid communication with one another, and
wherein said shut-off device includes a double-seated valve, the valve means comprise each a respective valve seat portion and valve disc portion of the double-seated valve, and the cavity, to which the fluid is supplied, is a recess arranged between the valve seat portions of the double-seated valve.

25. The method of claim 24, wherein the pressure in said cavity is provided to be higher than each of the respective pressures in the two fluid systems, thereby minimizing the risk of leakage between the two fluid systems in case of failure of the valve means.

26. The method of claim 24, wherein the fluid supplied to the cavity is supplied to the cavity via a valve device and the pressure in said cavity is monitored.

27. The method of claim 24, wherein leakage of the fluid supplied to the cavity into any of the fluid systems is monitored.

28. The method of claim 24, wherein one of the fluids in the fluid systems is liquid food.

29. The method of claim 24, wherein one of the fluids in the fluid systems is a cleaning liquid.

30. A shut-off arrangement minimizing leakage from a first one to a second one of two fluid systems in an apparatus provided for handling a fluid for human consumption, wherein each of the fluid systems includes a fluid at a respective pressure, said shut-off arrangement comprising:
a cavity and a respective valve means connecting the cavity to each of the two fluid systems,
each of the valve means preventing fluid communication from the cavity to the respective fluid system,
wherein the valve means acts to prevent fluid communication from the cavity to the fluid systems by supplying a fluid to said cavity to create a pressure in said cavity which is higher than one or each of the respective pressures in the two fluid systems, thereby preventing leakage from a first one to a second one of two fluid systems in case of failure of the valve means,
wherein each of the valve means is switchable into i) an open state wherein the cavity and the respective fluid system are in fluid communication with one another, and ii) a closed state, wherein the cavity and the respective fluid system are not in fluid communication with one another, and
wherein the valve means are each a switchable valve and the cavity, to which the fluid is supplied, is a chamber arranged between the valves.

31. The shut-off arrangement of claim 30 wherein the pressure in said cavity is provided to be higher than each of the respective pressures in the two fluid systems, thereby eliminating the risk of leakage between the two fluid systems in case of failure of the valve means.

32. The shut-off arrangement of claim 30 wherein said switchable valve means is automatically switchable and a control device is provided to control the switching of said automatically switchable valve means.

33. The shut-off arrangement of claim 30 wherein at least one of the valve means comprises a non-return valve.

34. A shut-off arrangement for minimizing leakage from a first one to a second one of two fluid systems in an apparatus provided for handling a fluid for human consumption, wherein each of the fluid systems includes a fluid at a respective pressure, said shut-off arrangement comprising:
a cavity and a respective valve means connecting the cavity to each of the two fluid systems,
each of the valve means preventing fluid communication from the cavity to the respective fluid system,
wherein the valve means acts to prevent fluid communication from the cavity to the fluid systems by supplying a fluid to said cavity to create a pressure in said cavity which is higher than one or each of the respective pressures in the two fluid systems, thereby preventing leakage from a first one to a second one of two fluid systems in case of failure of the valve means, wherein each of the valve means is switchable into i) an open state wherein the cavity and the respective fluid system are in fluid communication with one another, and ii) a closed state, wherein the cavity and the respective fluid system are not in fluid communication with one another, and wherein the shut-off arrangement includes a double-seated valve, the valve means comprise each a respective valve seat portion and valve disc portion of the double-seated valve, and the cavity, to which the fluid is supplied, is a recess arranged between the valve seat portions of the double-seated valve.

35. The shut-off arrangement of claim 34, wherein the pressure in said cavity is provided to be higher than each of the respective pressures in the two fluid systems, thereby eliminating the risk of leakage between the two fluid systems in case of failure of the valve means.

* * * * *